United States Patent [19]

Antenore et al.

[11] 4,447,463
[45] May 8, 1984

[54] PROCESS FOR PRODUCING A BUTTER/MARGARINE BLEND PRODUCT

[75] Inventors: Donald E. Antenore, Hudson; Donald W. Schmadeke; Rodney A. Stewart, both of Waterloo, all of Iowa

[73] Assignee: Land O'Lakes, Inc., Arden Hills, Minn.

[21] Appl. No.: 442,920

[22] Filed: Nov. 19, 1982

[51] Int. Cl.³ ............................................. A23D 3/02
[52] U.S. Cl. .................................... 426/603; 426/604
[58] Field of Search ................ 426/603, 604, 530, 663

[56] References Cited

U.S. PATENT DOCUMENTS

| | | |
|---|---|---|
| 263,042 | 8/1882 | Hobbs . |
| 264,714 | 9/1882 | Lauferty . |
| 265,833 | 10/1882 | Lauferty . |
| 285,878 | 10/1883 | Cochran . |
| 598,561 | 2/1898 | Dubuisson . |
| 611,495 | 9/1898 | Liebreich . |
| 859,823 | 7/1907 | Lillard . |
| 1,024,009 | 4/1912 | Kronenberger . |
| 1,028,804 | 6/1912 | Winship et al. . |
| 1,345,657 | 7/1920 | Zeuthen et al. . |
| 1,386,475 | 8/1921 | Wall et al. . |
| 1,400,341 | 12/1921 | Ashby . |
| 1,527,586 | 2/1925 | Hunziker . |
| 1,644,254 | 10/1927 | Karpinsky et al. . |
| 2,051,797 | 8/1936 | Feremutch . |
| 2,485,634 | 10/1949 | Vahlteich et al. ................ 99/119 |
| 2,592,224 | 4/1952 | Wilson et al. . |
| 2,611,707 | 9/1952 | Rourke et al. . |
| 2,745,750 | 5/1956 | Shafer et al. . |
| 2,797,164 | 6/1957 | McGowan et al. . |
| 3,338,720 | 8/1967 | Pichel . |
| 3,366,492 | 1/1968 | Voss et al. .......................... 426/603 |
| 3,386,835 | 6/1968 | Schaap . |
| 3,425,843 | 2/1969 | Japikse . |
| 3,488,199 | 1/1970 | Gander et al. . |
| 3,962,464 | 6/1976 | Sozzi ................................ 426/603 X |
| 4,177,293 | 12/1979 | Forman et al. ...................... 426/43 |
| 4,209,546 | 6/1980 | Johansson ........................... 426/603 |
| 4,217,372 | 8/1980 | Ebskamp ............................. 426/603 |
| 4,307,125 | 12/1981 | Amer ................................. 426/604 |

OTHER PUBLICATIONS

"Gold'n Flow . . . a Continuous Buttermaking System," taken from the Cherry-Burrell Company Sales Manual of Feb. 1954.

"Creamery Package Process," in *Fundamentals of Dairy Chemistry*, by Webb, Johnson and Alford, pp. 587–588, (3d ed.), 1980.

*Primary Examiner*—Robert A. Yoncoskie
*Attorney, Agent, or Firm*—Kinney & Lange

[57] ABSTRACT

A churn-free process for producing a spreadable dairy product includes the steps of: providing a cream having a fat content in the preferred range of approximately 38–42% butterfat; concentrating the cream to increase the fat content to at least 80% butterfat; processing the cream through a homogenizer such that the cream is inverted from an oil-in-water emulsion to a water-in-oil emulsion; adding a liquid vegetable oil to the water-in-oil emulsion; and cooling the vegetable oil/cream mixture sufficiently, preferably through a swept-surface heat exchanger, such that a viscous spread-like mixture is produced.

8 Claims, 3 Drawing Figures

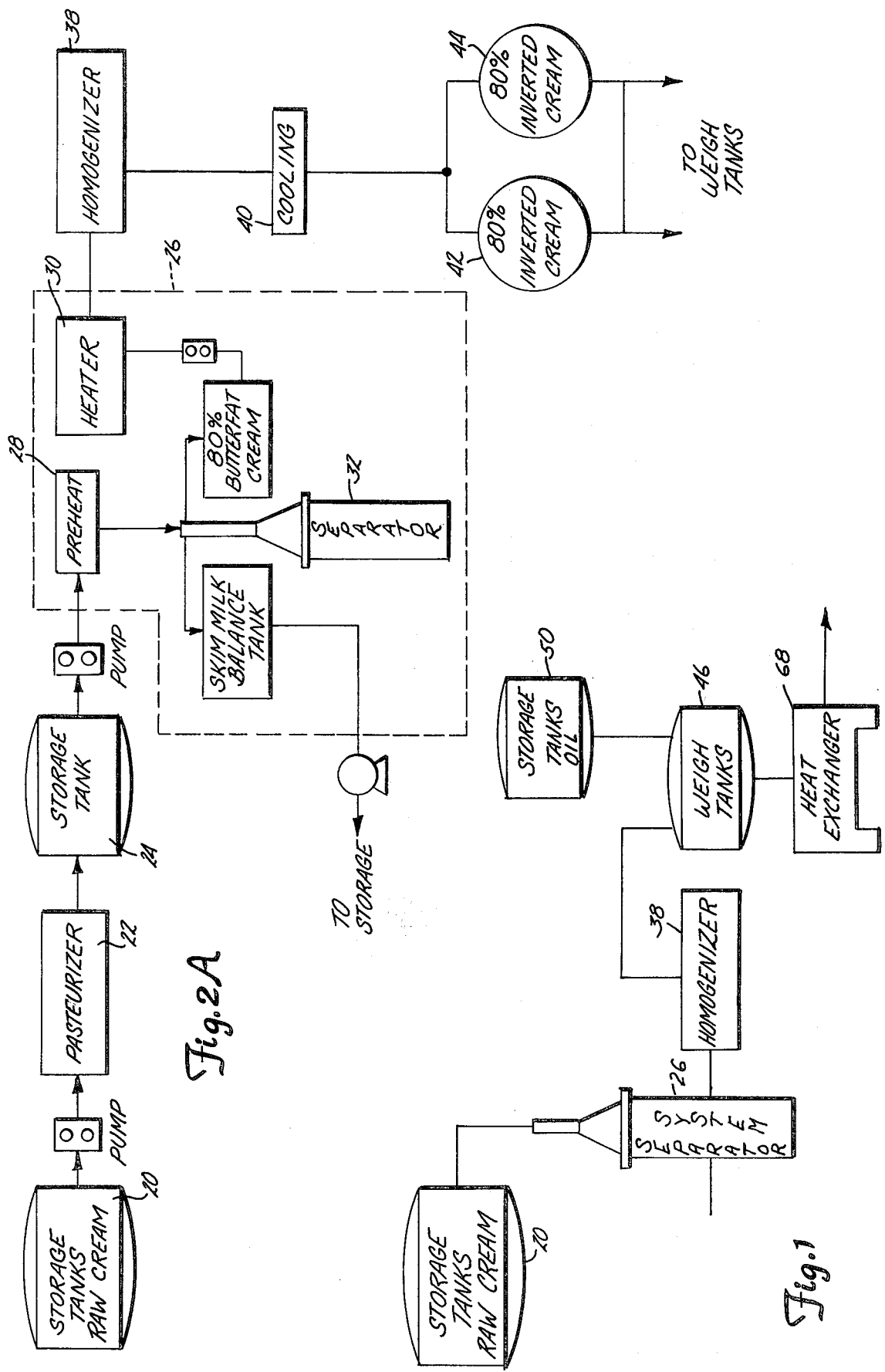

PROCESS FOR PRODUCING A BUTTER/MARGARINE BLEND PRODUCT

BACKGROUND OF THE INVENTION

1. Field of the Invention

The present invention relates to processes for producing spreadable dairy products.

2. Description of the Prior Art

The methods of producing butter and butter/margarine blend products are quite varied with some being quite old. One method that is well known in the prior art, is simply taking cream and placing the cream in a churn and churning the cream until butter is formed. Another method is described in the Hobbs U.S. Pat. No. 263,042 issued on Aug. 22, 1882. The Hobbs Patent describes a process wherein a fraction of vegetable oil is subjected to pressure and temperature to make the vegetable oil compatible with an "animal oleo margarine." The "animal oleo margarine" and the vegetable oil are melted and mixed with cream before emulsionizing. The mixture is then churned to obtain the "artificial butter" of the Hodds Patent.

In both methods described above, churning is used to convert an oil-in-water emulsion to a water-in-oil emulsion. In an oil-in-water emulsion, such as dairy cream, the water phase is the continuous phase and the emulsion has properties similar to water. In a water-in-oil emulsion, such as butter, the oil is in the continuous phase and the emulsion exhibits properties similar to oil, such as being greasy.

Other patents disclose further refinements in the production of spreadable dairy products, especially patents directed to the production of butter/margarine blend products. The Lauferty U.S. Pat. Nos. 264,714 and 265,833 issued on Sept. 19, 1882 and Oct. 10, 1882, respectively, the Cochran U.S. Pat. No. 285,878 issued on Oct. 2, 1883, the Libreich U.S. Pat. No. 611,495 issued on Sept. 27, 1898, the Winship et al U.S. Pat. No. 1,028,804 issued on June 4, 1912, the Wall U.S. Pat. No. 1,386,475 issued on Aug. 2, 1921, the Hunziker U.S. Pat. No. 1,527,586 issued on Feb. 24, 1925, the Vahlteich U.S. Pat. No. 2,485,634 issued on Oct. 25, 1949, and the Johansson U.S. Pat. No. 4,209,546 issued on June 24, 1980, describe various processes wherein a cream and vegetable oil are mixed and then churned.

Still other processes described in other patents include homogenizing a milk/vegetable oil mixture by passing the mixture through a homogenizer or an emulsifying machine. In the Ashby U.S. Pat. No. 1,400,341 issued on Dec. 13, 1921, an 80% vegetable oil and 20% milk mixture is passed through an emulsifying machine prior to churning. In the Forman et al U.S. Pat. No. 4,177,293 issued on Dec. 4, 1979, a lowfat content butter spread is produced by starting with cream which can include a vegetable oil, innoculating the mixture and then homogenizing. After homogenization, fermentation is permitted and the mixture is homogenized a second time. The product is then directly packaged.

Still other patents describe processes for making a spreadable dairy product without using a churn. The patents include the Dubuisson U.S. Pat. No. 598,561 issued on Feb. 8, 1898, the Lillard U.S. Pat. No. 859,823 issued July 9, 1907, the Kronenberger U.S. Pat. No. 1,024,009 issued on Apr. 23, 1912, the Zeuthen et al U.S. Pat. No. 1,345,657 issued on July 6, 1920, the Karpinsky et al U.S. Pat. No. 1,644,254 issued on Oct. 4, 1927, the Feremutsch U.S. Pat. No. 2,051,797 issued on Aug. 18, 1936, the Shafer et al U.S. Pat. No. 2,745,750 issued on May 15, 1956, and the Schaap U.S. Pat. No. 3,386,835 issued on June 4, 1968.

Other patents describe various processes which use a "Votator" paddle-type device for cooling a dairy product to a more viscous form.

The Japikse U.S. Pat. No. 3,425,843, issued on Feb. 4, 1969, describes a process that produces an emulsion for use in a salad dressing. One of the steps in the process consists of rapidly chilling the emulsion within a "Votator".

The Ebskamp U.S. Pat. No. 4,217,372, issued on Aug. 12, 1980, describes a process for improving the structural properties of fats by cooling an aqueous margarine solution through a series of apparatus which have rotating shafts and paddles and cooling zones.

The Pichel U.S. Pat. No. 3,338,720, issued on Aug. 29, 1967, also uses a Votator for making a margarine product by first churning the margarine emulsion and then passing the emulsion through a "Votator" for crystallization.

In addition, several other patents describe processes for producing margarine wherein the margarine is passed initially through a "Votator" and then is homogenized. These patents include the Rourke et al U.S. Pat. No. 2,611,707 issued on Sept. 23, 1952, the Wilson et al U.S. Pat. No. 2,592,224 issued on Apr. 8, 1952, the McGowan et al U.S. Pat. No. 2,797,164 issued on June 25, 1957, and the Gander et al U.S. Pat. No. 3,488,199 issued Jan. 6, 1970.

There are also several continuous processes for producing butter which are of interest and not described in any of the previously-mentioned prior art patents.

One process is known as the "Gold'n Flow" continuous buttermaking system by the Cherry-Burrell Company. Briefly, the Gold'n Flow process starts with cream in a holding tank. From the holding tank, the cream is pumped through a filter to a destabilizing unit. The destabilizing unit whips and partially destabilizes the cream prior to entry into a separator. In the separator, the fat content of the cream is increased to 88% or higher with light and heavy skim milk being removed as a byproduct. After the separator, the cream which is now a fat concentrate is discharged into a second surge tank and into a three-stage vacuum-type pasteurizer. From the pasteurizer, the fat concentrate is pumped into a "composition control unit" wherein the fat concentrate is analyzed for further processing. After the composition control unit, the concentrate flows into a butter chiller which is similar to a "Vogt Freezer". From the chiller, the butter is discharged at a temperature of about 40° F. and directly into a texturizer which allows time for the fat to crystallize and which further works the butter by forcing the butter through a perforated plate at its discharge end. When the butter leaves the texturizer, it is firm enough for printing and wrapping. The Cherry-Burrell process is also mentioned on page 587 of the "Fundamentals of Dairy Chemistry", by Webb, Johnson and Alford (3d ed.) 1980.

Another continuous process produces anhydrous milk fat, also called butter oil, which is approximately 99% butterfat. This continuous process is sold commercially by Carnation Company and briefly includes the following steps. First, the cream is concentrated from 40% to 80% fat content by first increasing the temperature of the fluid cream to 145° F. and pushing the cream into a centrifugal separator wherein the cream is concentrated to a range of 78–80% fat. Second, the phase of the concentrated cream is reversed from fat in serum to serum in fat. The concentrated cream is pumped into a phase reverser, a machine similar to a homogenizer. By controlling the pressure, the phase reverser breaks the membrane of the fat globules, releasing the fat from its globular state, the processing pressure ranging generally from 1200 to 1400 pounds. The third step is to concentrate the fat concentrate to 98–99% fat. The fourth step includes processing the 98–99% fat content concentrate through a centrifugal oil polisher which further increases the fat concentrate to 99.5%.

Still another continuous process, commonly referred to as the "Creamery Package Process", is mentioned in the "Fundamentals of Dairy Chemistry", by Webb, Johnson and Alford, pp. 587–588 (3d ed.) 1980. The "Creamery Package Process" utilizes homogenization to destabilize reseparated cream to produce butter.

Another process which produces a butter/margarine blend product is the subject of an application entitled, "Process for Making Butter/Margarine Blend" having Ser. No. 339,378 which was filed on Jan. 15, 1982 and is assigned to the same assignee as the present invention. The process includes homogenizing a skim milk/vegetable oil mixture such that the globule size of the vegetable oil is reduced to a size range naturally found in cream. The homogenized skim milk/vegetable oil mixture is then mixed with cream having a 40% butterfat content and the oil/cream mixture is then churned in a conventional continuous butter churn. Although the immediately described process produces a satisfactory butter/margarine blend product, the churning byproduct, buttermilk, contains amounts of vegetable oil. Amounts of vegetable oil in the buttermilk limit the range of use of the buttermilk.

SUMMARY OF THE INVENTION

The present invention includes a continuous process that produces a butter/margarine blend dairy spread and in which the skim milk is free of vegetable oil. The process includes concentrating cream to approximately at least an 80% fat level and then processing the cream through a homogenizer such that a phase inversion of the cream occurs, producing essentially a liquid butter. The liquid butter is then mixed with a vegetable oil at a preferred 40/60 ratio, respectively. The butter/margarine mixture is then pumped into a cooling unit such as a swept-surface heat exchanger wherein the mixture is cooled to a highly viscous form for packaging.

The process of the present invention provides a method that produces a butter/margarine blend dairy spread without the use of a churn. Cream is processed into liquid butter prior to addition of vegetable oil resulting in a skim milk byproduct containing no traces of vegetable oil. After the liquid butter and vegetable oil are mixed, the mixture is simply cooled to a viscous form for packaging.

BRIEF DESCRIPTION OF THE DRAWINGS

FIG. 1 is a simplified flow diagram of the present invention; and

FIGS. 2A and 2B collectively show a detailed flow diagram of the process.

DETAILED DESCRIPTION OF THE PREFERRED EMBODIMENT

Figure 2B:
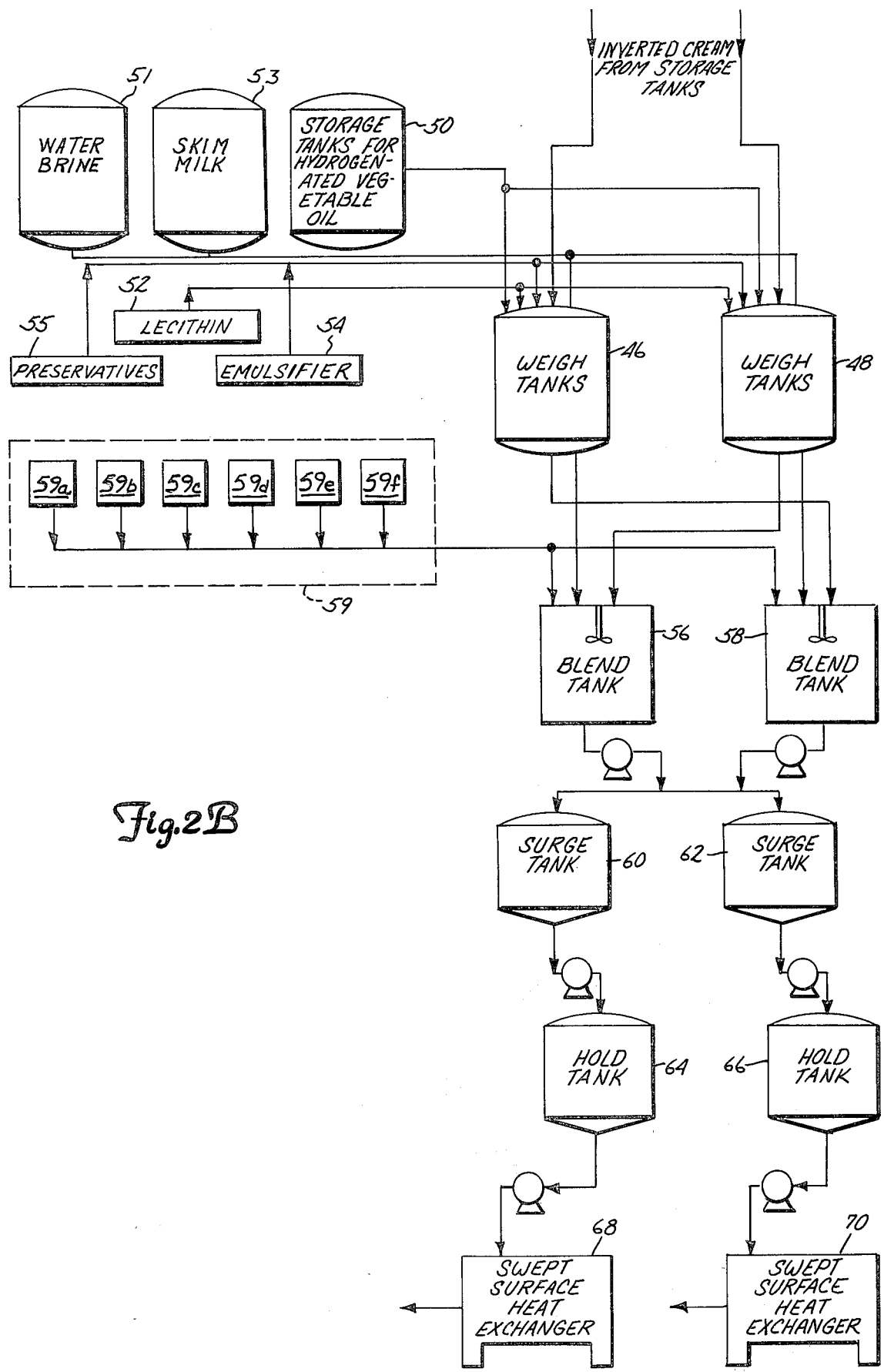

The butter/margarine blend process of the present invention is illustrated in a simplified flow diagram in FIG. 1 and is illustrated in a more detailed flow diagram separated into a first portion and a second portion, as illustrated in FIGS. 2A and 2B. The process produces a butter/margarine blend dairy spread and a nonvegetable oil bearing skim milk byproduct. No churning of the cream is required to produce the butter component of the present invention.

Referring to the simplified flow diagram in FIG. 1, the process provides cream stored in a plurality of storage tanks represented by tank 20. From the storage tank 20, the cream is processed through a separator system 26 on a continuous basis. In the separator system, the cream is concentrated to at least 80% butterfat and skim milk is removed. After the separator system 26, the cream is inverted in a homogenizer 38 to a water-in-oil emulsion. The inverted cream is then mixed with a vegetable oil in a ratio of 40% inverted cream to 60% vegetable oil. The mixture which is then cooled in a swept-surface heat exchanger 68.

The present invention provides a process wherein a butter/margarine blend product is produced on a continuous basis and in which a vegetable oil-free skim milk is produced. Although some of the prior art processes for producing butter are similar, none of these processes employ the mixing of vegetable oil with butter. Previous practice in trying to produce a butter/margarine blend product on a continuous basis resulted in a milk byproduct containing amounts of vegetable oil, limiting the usefulness of the milk byproduct. The present invention produces both a butter/margarine blend and a more useable skim milk product.

Referring now to the more detailed flow diagram in FIGS. 2A and 2B, and specifically to FIG. 2A, cream having a butterfat content in the approximate range of 38–42% is stored in the plurality of storage tanks 20. Preferably, the butterfat content of the cream is approximately 40%. The cream is stored in the storage tanks 20 within a temperature range of approximately 38°–42° F. with a preferred storage temperature of 40° F. It should be understood that all process temperatures mentioned are a mean temperature having at least a range of ±4° F.

From the storage tank 20, the cream is pumped to a pasteurizer 22 for pasteurization. The cream is preferably pasteurized at approximately 192° F. for approximately 22 seconds. The pasteurizer used is a conventional single stage type pasteurizer.

The cream is discharged from the pasteurizer at approximately 42° F. and is conveyed preferably to a plurality of storage tanks 24 where it is stored at approximately 40° F. The storage tanks 24 are used to hold the cream and provide a continuous supply of the cream for further processing as will be described subsequently.

From the storage tanks 24, the cream is pumped into the cream heater separator system 26. The cream heater separator system 26 includes a preheater 28, a heater 30 and a separator 32.

The preheater 28 and the heater 30 are heat exchangers which raise the temperature of the 40° F. pasteurized cream being pumped from the storage tanks 24. The cream is heated prior to entry into the separator 32 to help achieve the desired separation of the water component of milk from the butterfat. In the preheater 28, the cream's temperature is elevated to approximately 140° F.

From the preheater 28, the cream enters the separator 32 at approximately 140° F. The separator 32 is preferably a continuous centrifugal type separator which separates the cream into a skim milk phase and a concentrated cream phase. The separator 32 increases the butterfat content of the cream to at least 80%.

The skim milk leaves the separator 32 and is pumped to a cooling station and then to suitable storage tanks. The skim milk is a useful byproduct and is used as an additive with hydrogenated vegetable oil for margarine and other dairy products. The skim milk obtained from the process of the present invention, unlike other butter/margarine prior art processes and especially continuous processes, does not have any traces of hydrogenated vegetable oil and is consequently a more valued byproduct having a much wider use.

The concentrated cream is pumped up through the heater 30 to ensure that the temperature of the concentrated cream is approximately 165° F.

From the heater 30, the cream is forced through the homogenizer 38 at approximately 165° F. at about 1400-1600 psi. At these process conditions, the concentrated cream is turned from an oil-in-water emulsion to a water-in-oil emulsion. Typically, cream and milk are homogenized at approximately 2000-2500 psi. During homogenization carried on at "normal" process conditions, fat globules are merely reduced to a smaller size with their original membrane material being removed. However, when the butterfat content of the cream is at least approximately 80%, at the temperature and pressure stated previously, a phase inversion of the concentrated cream occurs wherein the cream turns essentially into a liquid butter.

One type of homogenizer preferred in the process of the present invention is made by Crepaco, Inc. of Chicago, Ill., Model No. 5DL425. Model No. 5DL425 homogenizer is a single stage five-cylinder homogenizer capable of processing and inverting 8000 pounds per hour of 80% butterfat content cream. Although a particular homogenizer has been discussed, it will be understood by those skilled in the art that other homogenizers capable of inverting an 80% butterfat cream are includable within the present invention.

After the homogenizer 38, the inverted cream is cooled to approximately 115° F. through a cooling unit 40. After the inverted cream is cooled, it is stored at 115° F. in preferably one of two storage tanks 42 or 44. At least two storage tanks are used to provide a continuous flow of inverted cream to the rest of the process.

The remaining portion of the process of the present invention is illustrated in FIG. 2. In one embodiment of the process being presently constructed, the portion of the process as illustrated in FIG. 2 is repeated, such that the portion of the process illustrated in FIG. 1 flows into two duplicate second portions. However, it should be understood that a single second portion, as illustrated in FIG. 2, is all that is needed for the present invention.

From the storage tanks 42, 44, inverted cream is transported to weigh tanks 46, 48. To each weigh tank 46, 48 is transported a predetermined amount of the inverted cream.

Hydrogenated vegetable oil is stored in a plurality of storage tanks represented by tank 50. A predetermined amount of hydrogenated vegetable oil 50 is also transported to the weigh tank 46, and/or 48. Preferably, approximately 40% of the mixture in each weigh tank is inverted cream and approximately 60% is hydrogenated vegetable oil.

Lecithin is stored in a container 52, skim milk is stored in tank 53, emulsifiers, such as mono and diglycerides, are stored in a tank 54, water solution of salt is stored in tank 51 and preservatives, such as sodium benzoate, are stored in tank 55. The lecithin, emulsifiers, brine and preservatives are also added to the mixture in the weigh tanks 46, 48.

When the proper amounts of vegetable oil, skim milk, inverted cream, lecithin, brine, emulsifiers and preservatives have been conveyed to either weigh tank, the contents of the weigh tank is allowed to flow to either blend tank 56 or blend tank 58. As is illustrated in FIG. 2, the contents of weigh tank 46 may be transported into either blend tank 56 or 58 and the contents of weigh tank 48 can be transported to either blend tank 56 or 58. Connecting the weigh tanks and the blend tanks in such a manner allows the most efficient use of the equipment in the process of the present invention.

Certain additives indicated by 59 are added to the mixture in either the blend tank 56 or the blend tank 58. For example, butter flavor 59a, starter distillate 59b, beta carotene 59c, lactic acid 59d, MARC artificial flavor 59e, and vitamin A palmitate 59f are added to the mixture in the blend tanks 56 and 58. The blend tanks 56 and 58 have agitators to mix the various additives and the inverted cream and hydrogenated vegetable oil along with the lecithin, skim milk, emulsifiers, brine and preservatives to form one substantially homogeneous mass.

From the blend tanks 56 and 58, the mixture is pumped into either surge tank 60 or 62, depending on availability. The surge tanks 60, 62 serve as reservoirs for holding excess amounts of material produced within the process and allowing the process, before and after the surge tanks, to operate essentially in a continuous manner.

From the surge tanks 60 and 62, the mixture is pumped into hold tanks 64 and 66. From hold tank 64, the material is pumped into the swept-surface heat exchanger 68. From hold tank 66, the material is pumped into a swept-surface heat exchanger 70. The swept-surface heat exchangers 68 and 70 cool the mixture into a viscous semi-solid mass. The mixture enters the swept-surface heat exchanger at approximately 120° F. and exits the swept-surface heat exchanger within a temperature range of 44°-56° F. and a preferred temperature range of 52°-54° F. The swept-surface heat exchanger has a cooled inner wall, preferably cooled by a refrigeration system such as ammonia, and a central shaft having paddles which scrape against the inner walls. The warm mixture enters the heat exchanger and cools on the inner walls. The paddles scrape the cooled mass from the walls and convey it to the discharge end of the heat exchanger. Typical swept-surface heat exchangers included within the process of the present invention are produced by Crepaco, Inc. of Illinois, Votator Division of Chemetron Corporation of Louisville, Ky., Cherry-Burrell of Iowa, and similarly configured heat exchangers produced by other manufacturers. The mixture exits the swept-surface heat exchangers 68 and 70 in a viscous semi-solid but still flowable state, ready for packaging.

The process of the present invention produces a butter/margarine dairy spread by mixing a hydrogenated vegetable oil with a cream that has essentially been converted into butter without the use of a churn. The byproduct obtained from converting the cream into essentially butter is a skim milk containing no vegetable oil.

Although the present invention has been described with reference to preferred embodiments, workers skilled in the art will recognize that changes may be made in form and detail without departing from the spirit and scope of the invention.

What is claimed is:

1. A churn-free continuous process for producing a margarine/butter spread comprising:
   concentrating a dairy cream to approximately at least an 80% butterfat content;
   processing the dairy cream through a homogenizer at a pressure and temperature such that the dairy cream is inverted from an oil-in-water emulsion to a water-in-oil emulsion;
   mixing the inverted cream with a vegetable oil to form a cream/oil mixture; and
   cooling the cream/oil mixture to a temperature effective to produce a spread-like viscous product.

2. The process of claim 1 and further comprising:
   providing a dairy cream having a butterfat content of at least 38% prior to concentrating.

3. The process of claim 2 wherein the butterfat content of the dairy cream is initially in the approximate range of 38%-42%.

4. The process of claim 1 wherein the cream is concentrated by processing through a continuous separator in a temperature range of approximately 136° F. to 144° F.

5. The process of claim 1 wherein the dairy cream is inverted by processing through a homogenizer at approximately 1400 to 1600 psi at a temperature range of approximately 161° F. to 169° F.

6. The process of claim 1 wherein the inverted cream is mixed with the vegetable oil in a 40/60 ratio, respectively.

7. The process of claim 1 wherein the cream/oil mixture is cooled in a swept-surface heat exchanger.

8. The process of claim 7 wherein the cream/oil mixture is cooled in an approximate temperature range of 44° F. to 56° F.

* * * * *

UNITED STATES PATENT AND TRADEMARK OFFICE
CERTIFICATE OF CORRECTION

PATENT NO. : 4,447,463   Page 1 of 2

DATED : May 8, 1984

INVENTOR(S) : Donald E. Antenore et al

It is certified that error appears in the above-identified patent and that said Letters Patent is hereby corrected as shown below:

References Cited

Under the section for FOREIGN PATENT DOCUMENTS, please add the following foreign reference:

637,792    5/1950    Great Britain

In the Claims

In claim 1, line 1, delete the word "producing" and insert therefor: --blending a hydrogenated vegetable oil and butter to produce--.

In claim 1, line 8, after the words "a water-in-oil emulsion" add the following: --to form a liquid butter--.

In claim 1, line 9, delete the words "inverted cream" and insert therefor: --liquid butter--.

UNITED STATES PATENT AND TRADEMARK OFFICE
CERTIFICATE OF CORRECTION

PATENT NO. : 4,447,463

DATED : May 8, 1984

INVENTOR(S) : Donald E. Antenore et al

It is certified that error appears in the above-identified patent and that said Letters Patent is hereby corrected as shown below:

In claim 1, line 10, delete the words "cream/oil mixture" and insert therefor: --liquid butter/oil mixture with at least approximately 60% oil by weight of the mixture--.

In claim 1, line 11, delete the words "cream/oil mixture" and insert therefor: --liquid butter/oil mixture without churning--.

In claim 6, line 1, delete the words "inverted cream" and insert therefor: --liquid butter--.

In claim 7, line 1, delete the words "cream/oil" and insert therefor: --liquid butter/oil--.

In claim 8, line 1, delete the words "cream/oil" and insert therefor: --liquid butter/oil--.

Signed and Sealed this

Sixteenth Day of October 1984

[SEAL]

Attest:

*Attesting Officer*

GERALD J. MOSSINGHOFF

*Commissioner of Patents and Trademarks*